Jan. 27, 1959 L. P. THOMAS 2,871,288
STABILIZED AGC SYSTEM
Filed Nov. 14, 1952
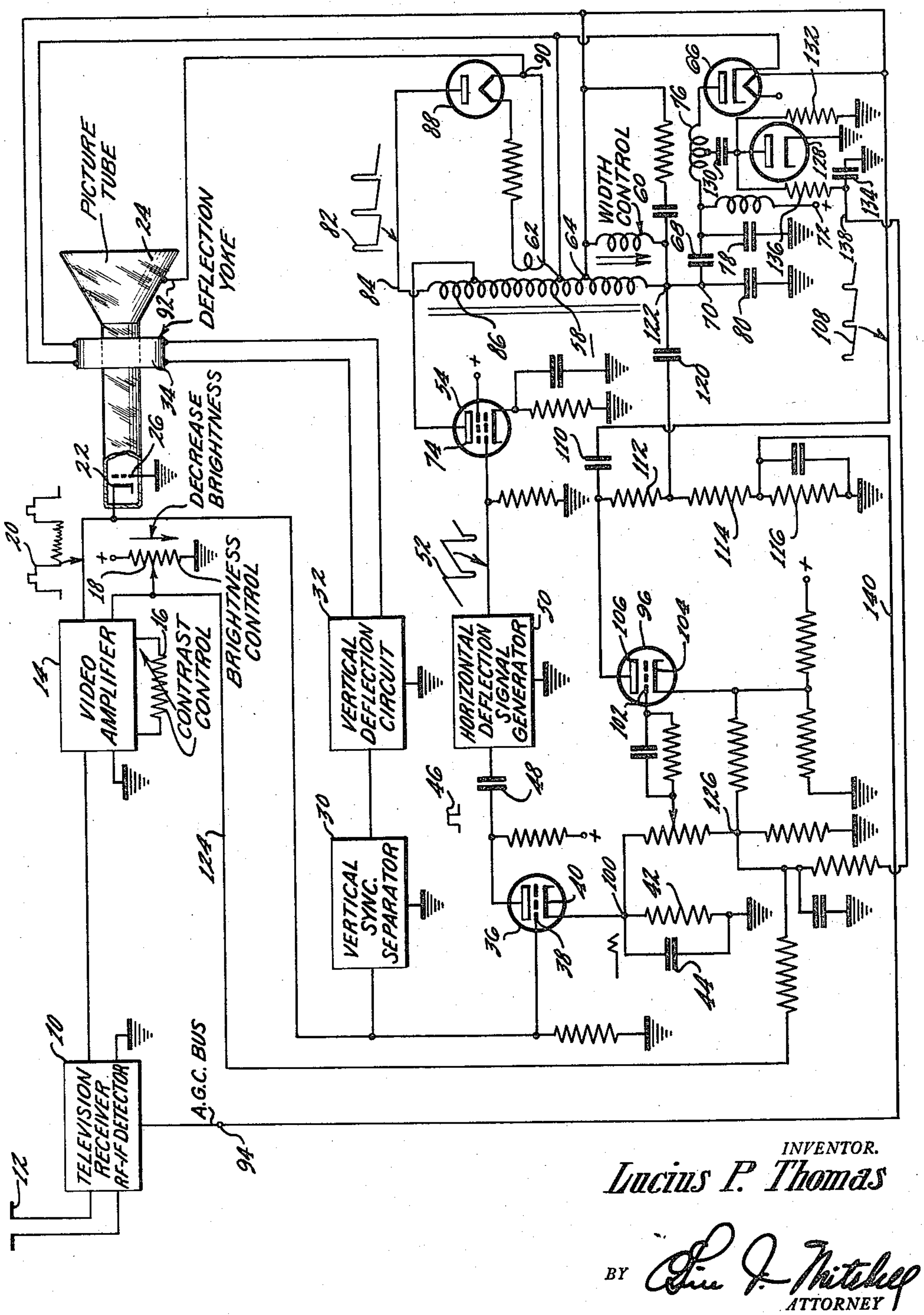
INVENTOR.
Lucius P. Thomas
BY [signature]
ATTORNEY United States Patent Office 2,871,288

Patented Jan. 27, 1959

2,871,288

STABILIZED AGC SYSTEM

Lucius P. Thomas, West Collingswood, N. J., assignor to Radio Corporation of America, a corporation of Delaware Application November 14, 1952, Serial No. 320,487

8 Claims. (Cl. 178—7.5)

The present invention relates to improvements in automatic gain control circuits for radio receiving systems and more particularly, although not necessarily exclusively, to automatic gain control circuits of the type applicable to television signal receiving equipment.

The present invention relates more directly to improvements in stabilizing arrangements for automatic gain control circuits of the type which develop AGC potential through the controlled rectification of a pulsed waveform.

No greater need for the provision of a highly stable and precision automatic gain control circuit perhaps exists than in the television art. The most minute changes in the amplitude of the signal demodulated by television receiving circuits and applied to a picture tube or kinescope, is noticeable by the human eye. As a consequence of this, and in order to abide the highly competitive nature of the television industry, many circuit arrangements have been devised with the aim of providing maximum automatic gain control operating efficacy, consistent with maximum economy. In genaral, it may be said, however, that the greater the automatic gain control circuit gain and the greater the noise immunity the automatic gain control circuit provides, the more expense must be tolerated.

One of the technical difficulties involving circuit expense, which characterizes automatic gain control circuits, is the general requirement that a negative potential with respect to circuit ground be provided for application to the control electrodes of the amplifier tubes whose gains are to be controlled. A prior art method of overcoming the need for a special and separate D.-C. supply for providing a negative polarity with respect to circuit ground, has been to take advantage of the relatively high amplitude retrace pulses appearing in the horizontal deflection circuits of television receivers. It has been found expedient to rectify these high amplitude pulses by means of a grid controlled rectifier stage so connected as to develop a negative potential with respect to circuit ground. The value of this potential is then made a direct function of the peak amplitude of the received television signal by applying synchronizing pulse waveforms (including D.-C. information) to the control grid of the rectifier. The combination utilization of the flyback pulse developed in the horizontal deflection circuits with the arriving television synchronizing pulses provide, in this way, a highly convenient method of developing the required AGC potential.

In the attempt to practice this prior art arrangement, however, it was early noticed, in those television receiver circuits which also derive from rectification of the horizontal flyback pulse a high voltage for use as a beam accelerating potential for the kinescope, that changes in the average brightness of the television scene produced corresponding changes in the loading on the flyback pulse high voltage power supply. This, in turn, reflected itself in a change in the amplitude of the flyback pulse applied to the automatic gain control system of the receiver. The result was that areas in the television picture of greater brightness had greater contrast due to the decrease of negative AGC potential and the consequent increase in the gain of the television receiver. Furthermore, these undesirable and sometimes rapid changes in the gain of the television receiver caused other undesirable changes in the clipping level and noise limiting action in the receiver.

It is, therefore, a purpose of the present invention to provide an improved automatic gain control circuit which is highly stable in operation and yet is economical in manufacture.

It is further a purpose of the present invention to provide an automatic gain control circuit for use in television receivers in which advantage is taken of horizontal deflection waveforms and their derivatives for the development of a highly stable automatic gain control potential.

It is further an object of the present invention to provide an improved automatic gain control circuit capable of developing an automatic gain control potential from the rectification of periodically recurrent pulses, such that the magnitude of automatic gain control potential developed is substantially free from rapid fluctuations in the amplitude of the rectified pulses when such changes of amplitude are produced through the erratic loading by other influences of the source of the periodically recurring pulses.

In the realization of the above objects and features of advantage, it is broadly contemplated in the practice of one form of the present invention to provide a corrective feedback arrangement connected from the source of pulses whose rectification is made to produce the AGC potential, to the output circuit of the AGC pulse rectifying means. The feedback circuit is connected to a point within the pulse source which reflects changes in the overall loading of the pulse source. The feedback circuit employs a capacitive means so that the feedback signal is a waveform representing net changes in the loading of the pulse source. This "change" waveform when applied to the output of the AGC rectifier produces the novel stabilizing effect of the present invention. In television receiving circuits employing horizontal deflection circuit flyback pulses as a source of automatic gain control potential, the feedback path may be conveniently connected from the AGC stage to a point in the horizontal deflection circuit which reflects changes in high voltage loading as a result of changes in scene brightness. In some embodiments of the invention, this feedback path may include rectifying means which produces a D.-C. type control voltage, which is applied to appropriate points in the AGC system to correct for changes in scene brightness.

A more complete understanding of the present invention, as well as other objects and features of advantage will be obtained through a reading of the following specification, especially when considered in connection with the single figure of the drawings which is a combination block and schematic diagram of a television receiving system embodying the novel feature of the present invention.

Turning now to the figure, there is indicated by the block 10, television receiver R.-F. I.-F. and detector circuits well known in the art. The receiver circuits are supplied with television modulated radio signal by means of the antenna 12. The output signals of the television receiver 10 are then applied to the input circuit of a standard video amplifier 14. The video amplifier is provided with some convenient form of contrast control 16 and a suitable form of brightness control 18. Output signals 20 of the video amplifier 14 are then applied to the cathode 22 of the picture tube or kinescope 24. The grid 26 of the picture tube is suitably grounded.

Video signal 20 is also applied to the input terminal of a vertical sync separator circuit 30, which in turn controls a vertical deflection circuit 32. The output terminals of the vertical deflection circuit are connected to the appropriate vertical deflection winding terminals of the deflection yoke 34. Video signal 20 is also applied to a horizontal sync separator circuit involving the discharge tube 36. As shown in the figure, video signal is applied to the grid 38 of the sync separator tube, the cathode 40 of tube 36 is connected with ground through a time constant circuit involving resistor 42 and capacitor 44. Separated horizontal sync signal 46 is coupled via capacitor 48 to the horizontal deflection signal generator 50. The output signal 52 of the deflection signal generator 50 is then applied to the horizontal deflection output tube 54.

The circuitry of the horizontal deflection output stage as well as the other circuits thus far described are well known in the art, as for example shown and described on pages 73 through 80 of volume 9 of Rider's Television Manual, 1951–52.

The deflection waveform 52 produces a sawtooth current through the auto transformer 58 across a portion of which is connected a width control 60. Across another portion of the auto transformer winding 58, defined by terminals 62 and 64, is connected the horizontal deflection windings of the deflection yoke 34. A rectifier tube 66, acting as a retrace damping tube causes energy to be stored up in the capacitor 68 which energy represents the magnetic energy stored in the deflection yoke horizontal winding and auto transformer during the trace portion of the deflection signal. This action is well known in the art and need not be further described here. Since the capacitor 68 is in series with the lower terminal 70 of the auto transformer 58 and the B power supply potential terminal at 72, it will be seen that the stored energy in the capacitor 68 will increase the effective power supply potential applied to the anode 74 of the horizontal deflection tube 54. Inductor 76, which may be made variable, taken in combination with capacitors 78 and 80 form a well known means for controlling the linearity of the horizontal deflection action. The horizontal flyback pulse 82 appears in magnified form at the upper terminal 84 of the auto transformer 58 by virtue of the winding section 86. The signal 82 is then applied to the high voltage rectifier 88 whose D.-C. output voltage appearing at terminal 90 is applied to the second anode accelerating terminal 92 of the picture tube 24.

An automatic gain control circuit for the television receiver R.-F. and I.-F. sections included in the block 10 is indicated as having a terminal at 94 to which is to be applied a suitable automatic gain control potential. In the arrangement shown in the figure, this potential is developed in a somewhat convention manner by means of an AGC tube 96. The basic operation of this type of AGC circuit is well known and is shown and described in the above referenced publication. Briefly separated horizontal synchronizing pulses appearing at the cathode terminal 100 of the horizontal sync separator 36 are D.-C. coupled to the control electrode 102 of the AGC tube 96. The separated sync signals appearing at the cathode terminal 100 are positive going and hence produce grid rectification between the control electrode 102 and the cathode 104 of the AGC tube 96. An average potential is then set up on the control electrode 102 representing the peak amplitude of the incoming television signal. The anode 106 of the AGC tube 96 is then adapted to receive positive going flyback pulses 108 which are nothing more than a lesser amplitude version of the flyback pulses 82 discussed above. The pulses 108 are coupled by a capacitor 110 from one terminal of the horizontal deflection winding to the AGC tube 96. A resistance load comprising resistance 112, 114 and 116 is connected from the anode 106 of the AGC tube to ground potential. It will be seen that the positive going pulses 108 will, therefore, be rectified by the AGC tube 96 to produce a negative potential at the upper terminal of resistance 116. This potential, being negative with respect to chassis or circuit ground is suitable for application to the AGC bus 94 of the television receiver 10. The magnitude of the AGC potential will also be seen to be a function of the average potential appearing on the grid of tube 96 as well as the amplitude of the pulses 108 rectified by the tube 96. If it is assumed that the pulses 108 are constant in amplitude the AGC tube will vary as a direct function of received signal strength.

However, in practice, it has been found that a television scene having areas of different average brightness will cause a variation in the average beam current in the kinescope or picture tube 24. Since the average beam current varies considerably within a frame of the television scene it follows that the loading on the high voltage power supply terminal 90 will also vary, which will consequently cause the amplitude of the flyback pulse 82 to change. This, of course, is reflected in a corresponding change, during a frame interval, of the pulses 108 applied to the AGC tube 96. Hence the AGC potential developed at the upper terminal of resistance 116 will undesirably vary as a function of scene brightness. One of the reasons why such variation is undesirable rests upon the fact that under such conditions a given television scene will have a different degree of contrast in bright areas than in dark areas and thus the entire gamma characteristics of the television system will be upset.

The above discussion pertains to prior art problems and conditions and will be found in numerous television receiving arrangements other than the particular circuit shown in the figure.

In accordance with the present invention the above problems are overcome through the use of a novel feedback arrangement from a point within the horizontal deflection system to the AGC circuit. This feedback may be accomplished in a variety of ways and in some instances the simultaneous application of two or more feedback paths may be advantageous. By way of example, attention is directed to the capacitor 120 in the drawing which is connected from the left hand terminal of B boost capacitor 68 and the upper terminal of load resistance 114 through which is developed AGC potential. In accordance with the present invention, advantage is taken of the fact that any change in picture brightness will be reflected in a change in the B boost potential appearing at the left hand terminal of capacitor 68. This follows since, as discussed above, and as is well known in the art, the magnitude of B boost potential is directly proportional to the magnitude of energy recovered during the flyback interval of the deflection cycle. Thus, if additional energy is required for beam acceleration, less B boost voltage can be expected. Thus, the B boost terminal 122 will tend to drop in positive potential whenever the picture brightness increases. The actual drop or negative going change in potential at terminal 122 will be conveyed by capacitor 120 to the load circuit of the AGC tube 96. If the size of the capacitor 120 is properly selected this negative going change as applied to the AGC tube load will be such to compensate for the decrease in rectified AGC potential resulting from a decrease in the amplitude of pulses 108 as scene brightness increases. Thus a picture of uniform contrast, independent of brightness variations may be realized.

It is clear that the action of capacitor 120 compensates for only abrupt changes in brightness level throughout a scene and does not compensate for changes in the settings of the brightness control 18. Changes in the setting of the brightness control 18 may be easily compensated by means of a circuit path 124 which places a connection between the arm of the potentiometer 18 and a point 126 in the grid circuit of the AGC tube 96. Thus when the brightness control 18 is positioned to decrease the brightness of the television picture, the potentiometer arm will be lowered. This will reduce the load on the high voltage rectifier 88 and hence increase the amplitude of the AGC pulsing waveform 108. This will be followed by an increase in the negative voltage developed by the AGC circuit and applied to terminal 94. Such an increase will be compensated by the fact that the circuit path 124 will apply a low positive potential to the terminal 126 thus reducing the conductance of the AGC tube 96 during the duty cycles of the pulses 108.

An additional means falling within the scope of the present invention in producing a dynamic correction of the AGC circuit in response to varying amplitudes of the pulses 108, is provided by the diode 128. Diode 128 is capacitively coupled by a capacitor 130 to a tap on the linearity control 76. By means of load resistor 132 and a filter circuit comprising capacitor 134 and resistor 136, a potential at terminal 138 may be derived which is substantially proportional to changes in the loading of the horizontal deflection circuit. As is well known in the art, the waveform appearing across the linearity inductance 76 tends to have a more peaked configuration as loading of the horizontal deflection circuit by the kinescope beam current demands becomes heavier. See an article entitled "Magnetic Deflection Circuits for Cathode Ray Tubes" by O. H. Schade, appearing in the "RCA Review" for September 1947. Thus, increased brightness in the picture area will produce a higher positive voltage at terminal 138 which is conveyed by a circuit path 140 to the terminal 126 to the grid circuit in the AGC tube 96. This will cause the AGC tube 96 to become more conductive during periods of heavier beam current loading of the horizontal deflection circuit and thereby compensate for the reduction in the amplitude of the pulses 108 resulting from such loading.

It will be seen that although the novel features of the present invention find very convenient and fortunate application to television receiving circuits, that the principles thereof are in no way limited thereto. In the electronic art use is many times made of a source of signal waveforms, the amplitude of whose signal is poorly regulated with respect to varying load demands on the generator by a number of utilization devices. Thus regulation of the potential developed through rectification of such a poorly regulated waveform may be accomplished on a dynamic basis through the practice of the present invention. Moreover, as applied to radio receiving circuits embodying automatic gain control systems, static as well as dynamic regulation and/or compensation of the automatic gain control circuit may be realized.

It will be further understood that although in the figure, a combination of two forms of dynamic automatic gain control compensation has been shown, either one can be adjusted to provide virtually complete regulation of the circuit in the absence of the other. That is to say, the capacitor 120 in the figure could be removed and sole reliance placed on the correction developed by the diode 128. Vice versa, the diode 128 may be omitted and the size of the capacitor 120 suitably adjusted in the connection shown. In general, it is desirable to place more reliance on the diode rectification in circuits where the load impedance of the AGC rectifier is very low, whereas in circuits where the impedance of the AGC tube load impedance is relatively high, the capacitor 120 may be more economically employed.

What is claimed is:

1. An automatic gain control circuit for receivers of the type including deflection control circuit means for a cathode ray tube, comprising the combination of means for deriving first and second operating potentials from said deflection control circuit means subject to amplitude variations in response to varying load demands on said deflection control circuit means, an automatic gain control amplifier stage including an input electrode, an output electrode and a common electrode, means providing an input circuit for said automatic gain control amplifier stage connected between said input electrode and said common electrode, an output circuit for deriving an automatic gain control potential the amplitude of which is a function of the signal strength of a signal wave applied to said input circuit connected between said output electrode and said common electrode, means for applying said first operating potential from said deflection control circuit means between a pair of said electrodes whereby variations in said first operating potential produces variations in the resulting automatic gain control potential, and means applying said second operating potential from said deflection control means to said output circuit in a polarity such that variations in said second operating potential compensate for said variations in automatic gain control potential.

2. An automatic gain control system for receivers of the type including a kinescope, deflection coils for controlling the deflection of a cathode ray beam in said kinescope, sawtooth current generating means including an inductive winding connected with said deflection coils, and a power recovery circuit connected to said winding comprising the combination of an amplifier stage including an input electrode, an output electrode and a common electrode, means providing an input circuit responsive to the synchronizing pulse component of a composite television wave connected between said input electrode and said common electrode, an output circuit for deriving an automatic gain control potential the amplitude of which is a function of the signal strength of said composite wave connected between said output electrode and said common electrode, means coupling a pair of said electrodes with said winding to derive an operating potential for said amplifier the amplitude of which is subject to the loading of said sawtooth current generating means thereby producing variations in the resulting automatic gain control potential, and means connecting said power recovery circuit with said output circuit to compensate for said variations in automatic gain control potential.

3. In a television receiver of the type including a variable gain signal amplifier, a kinescope, deflection coils for controlling the deflection of a cathode ray beam in said kinescope, sawtooth current generating means including an inductive winding connected with said deflection coils, and a power recovery circuit connected to said winding, an automatic gain control system comprising the combination of an electron tube amplifier stage including an anode, a cathode and a control electrode, an input circuit for said amplifier stage connected between said control electrode and said cathode, an output circuit connected between said anode and cathode and including means for deriving an automatic gain control potential the negative amplitude of which is a function of the amplitude of the synchronizing pulse components of a television wave applied to said input circuit, means coupling said anode to said winding to derive a polarizing potential for said tube subject to amplitude variations which produces variations in the resulting automatic gain control potential, means including a capacitor connecting said power recovery circuit with said output circuit to compensate for said variations in automatic gain control potential, and means for applying said automatic gain control potential to said variable gain signal amplifier to vary the gain thereof as an inverse function of the received signal strength.

4. An automatic gain control system for receivers of the type including a kinescope, deflection coils for controlling the deflection of a cathode ray beam in said kinescope, sawtooth current generating means including an inductive winding connected with said deflection coils, and a power recovery circuit connected to said winding comprising the combination of an electron tube amplifier stage including an anode, cathode and a control electrode, an input circuit for said amplifier stage connected between said control electrode and said cathode, an output circuit connected between said anode and cathode for deriving an automatic gain control potential the negative amplitude of which is proportional to the signal strength of a composite wave applied to said input circuit, said output circuit including at least two serially connected resistors, means coupling said anode and said cathode to said winding to derive a polarizing potential for said tube which is subject to amplitude variations due to the loading of said sawtooth current generating means thereby producing variations in the resulting automatic gain control potential, and means including a capacitor connected between said power recovery circuit and the junction of said first and second resistors to compensate for said variations in automatic gain control potential.

5. An automatic gain control circuit for television receivers of the type including deflection control circuit means for a cathode ray tube, comprising the combination of means for deriving a first signal from said deflection control circuit means providing a recurrent pulse at the line repetition rate for said receiver, the amplitude of said signal subject to variations in response to varying load demands on said deflection control circuit means, power recovery circuit means connected to said deflection control circuit means for providing a second signal from said deflection control means the amplitude of which is subject to variations in response to varying load demands on said deflection control circuit means in the same direction as said first signal, an automatic gain control amplifier stage including an input electrode, an output electrode and a common electrode, an input circuit for a composite television wave including recurrent synchronizing pulse components connected between said input electrode and said common electrode, means providing an output circuit for deriving an automatic gain control potential the amplitude of which is a function of the peak signal amplitude of the synchronizing pulse components of said composite wave connected between said output electrode and said common electrode, means for applying said first signal from said deflection control circuit means between said output electrode and another of said electrodes whereby variations in the amplitude of said first signal produces variations in the amplitude of the resulting automatic gain control potential, and means applying said second signal from said power recovery circuit means to said output circuit to compensate for said variations in automatic gain control potential.

6. An automatic gain control circuit for television receivers of the type including deflection control circuit means for a cathode ray tube, comprising the combination of means for deriving a first signal from said deflection control circuit means providing a recurrent pulse at the line repetition rate for said receiver, the amplitude of said signal subject to variations in response to varying load demands on said deflection control circuit means, power recovery circuit means connected to said deflection control circuit means for providing a second signal from said deflection control means the amplitude of which is subject to variations in response to varying load demands on said deflection control circuit means in the same direction as said first signal, an automatic gain control amplifier stage including an input electrode, an output electrode and a common electrode, an input circuit for a composite television wave including recurrent synchronizing pulse components connected between said input electrode and said common electrode, means providing an output circuit for deriving an automatic gain control potential the amplitude of which is a function of the peak signal amplitude of the synchronizing pulse components of said composite wave connected between said output electrode and said common electrode, said output circuit including a first and second resistors serially connected in the order named between said output electrode and said common electrode, means for applying said first signal from said deflection control circuit means between said output electrode and another of said electrodes whereby variations in the amplitude of said first signal produces variations in the amplitude of the resulting automatic gain control potential, and means applying said second signal from said power recovery circuit means across said second resistor of said output circuit to compensate for said variations in automatic gain control potential.

7. In a television receiving system of the type including a variable gain signal amplifier, deflection control circuit means for a cathode ray tube, the combination comprising means for deriving first and second operating potentials from said deflection control circuit means subject to amplitude variations in response to varying load demands on said deflection control circuit means, an automatic gain control circuit including an amplifier stage having an input electrode, an output electrode and a common electrode, means providing an input circuit for a composite television wave including recurrent synchronizing pulses connected between said input electrode and said common electrode, means providing an output circuit for deriving an automatic gain control potential for controlling the gain of said amplifier as an inverse function of the signal strength of the composite wave connected between said output electrode and said common electrode, said output circuit including at least two serially connected resistors, means for applying said first operating potential from said deflection control circuit means between two of said electrodes to provide a polarizing potential for said amplifier whereby variations in said first operating potential produces variations in the resulting automatic gain control potential, and means including a capacitor for applying said second operating potential from said deflection control means across one of the resistors of said output circuit to compensate for said variations in automatic gain control potential.

8. Apparatus according to claim 7 wherein there is additionally provided a brightness control means in said television receiving system which controls the beam current requirements of said cathode ray tube imposed upon said deflection control circuit means, potential developing means connected with said brightness control for developing a control potential corresponding to the brightness setting in said television receiving system, and means connecting said voltage developing means to said amplifier stage input circuit to control the conduction thereof.

References Cited in the file of this patent

UNITED STATES PATENTS

| | | |
|---|---|---|
| 2,301,522 | Cawein | Nov. 10, 1942 |
| 2,672,505 | Schwarz | Mar. 16, 1954 |
| 2,673,892 | Richman | Mar. 30, 1954 |
| 2,740,070 | Ogletree | Mar. 27, 1956 |

OTHER REFERENCES

Rider (Vol. 10), Stromberg-Carlson, page 10–5, April 1952.

Rider (Vol. 9), Spartan, page 9–16 (received in the Scientific Library July 21, 1952).